(12) United States Patent
King

(10) Patent No.: US 8,136,792 B2
(45) Date of Patent: Mar. 20, 2012

(54) DOUBLE CONTAINMENT VALVE SYSTEM

(75) Inventor: Ralph E. King, Friendswood, TX (US)

(73) Assignee: Equistar Chemicals, L.P.

( * ) Notice: Subject to any disclaimer, the term of this patent is extended or adjusted under 35 U.S.C. 154(b) by 412 days.

(21) Appl. No.: 12/456,635

(22) Filed: Jun. 19, 2009

(65) Prior Publication Data

US 2010/0320411 A1    Dec. 23, 2010

(51) Int. Cl.
*F16K 25/00* (2006.01)
(52) U.S. Cl. ......... 251/214; 277/514; 277/516; 277/523
(58) Field of Classification Search .............. 251/214, 251/366; 277/510, 514, 516, 518, 523
See application file for complete search history.

(56) References Cited

U.S. PATENT DOCUMENTS

| | | | | |
|---|---|---|---|---|
| 2,864,631 A | * | 12/1958 | Kemp | 277/346 |
| 4,340,204 A | * | 7/1982 | Herd | 251/327 |
| 4,363,465 A | * | 12/1982 | Morrill | 251/214 |
| 4,886,241 A | * | 12/1989 | Davis et al. | 251/214 |
| 4,972,867 A | * | 11/1990 | Ruesch | 137/15.11 |
| 5,190,264 A | * | 3/1993 | Boger | 251/214 |
| 5,230,498 A | * | 7/1993 | Wood et al. | 251/214 |
| 5,263,682 A | * | 11/1993 | Covert et al. | 251/214 |
| 5,316,319 A | * | 5/1994 | Suggs | 277/308 |
| 6,561,517 B2 | * | 5/2003 | James | 277/511 |
| 7,048,254 B2 | * | 5/2006 | Laurent et al. | 251/214 |

* cited by examiner

*Primary Examiner* — John Bastianelli

(57) ABSTRACT

A stemmed control valve having a housing containing a first packing assembly that is compressively loaded externally of the housing, and a second packing assembly that is independently compressively loaded in a fixed manner internally of the housing.

7 Claims, 4 Drawing Sheets

DOUBLE CONTAINMENT VALVE SYSTEM

BACKGROUND OF THE INVENTION

1. Field of the Invention

This invention relates to valve systems that employ a moving valve stem surrounded by multiple packing sets that are compressed by a moving packing follower.

2. Description of the Prior Art

For sake of clarity of comparison and brevity only, and not by way of limitation, the prior art valves and the valves that employ this invention will be described as though the movable stem was disposed vertically. The valves of this invention, like those of the prior art, can be employed in any spatial orientation from a vertical stem (up or down) to a horizontal stem, and any angle there between.

This invention also applies to moving stem valves in general. For example, this invention applies to an elongate stem that 1) is moved directly along its longitudinal axis to open and close the fluid flow passage of the valve body, 2) is rotated about its longitudinal axis to effect movement along that longitudinal axis to open and close the fluid flow passage of the valve body, e.g., gate type valves, and 3) is rotated about its longitudinal axis to open and close the fluid flow passage of the valve body without movement of the stem along its longitudinal axis, e.g., butterfly, ball, or plug type valves. The various structures for and operations of the foregoing types of stem valves are well known in the art and further description is not necessary to inform the art.

Again, for sake of clarity of comparison and brevity only, and not by way of limitation, the prior art valves and the valves that employ this invention will be disclosed in detail hereinafter in respect of valves whose stem is moved directly along the longitudinal axis of the stem to open and close the fluid flow passage of the valve body Heretofore, valve assemblies using a moving stem carrying a control member to close and open a fluid flow passage in a valve body have employed a packing set surrounding the movable (along the long axis and/or around the long axis) stem with a packing follower pressed onto the top of the packing set to apply a sealing compressive force to the packing and stem. Such assemblies are reliable, but not sufficiently reliable to satisfy the requirements for valves that are to be used in hazardous waste service.

Hazardous waste service requires double containment of the packing, i.e., more than one packing set around the stem, leak detection, and controlled bleed off of process fluid that manages to by-pass the lower most (primary) packing set.

Employing at least one additional packing set above the primary packing set does not provide satisfactory double containment service for hazardous waste purposes. This is so because transmitting the packing compression load by way of a movable packing follower at the top of a packing stack containing multiple packing sets does not uniformly transmit the sealing compressive loading force from that packing follower through the upper most packing set to the lower most packing set. Put another way, the friction in the stack of multiple (two or more) packing sets has been found greatly to reduce the compressive load going down the stacked packing sets. This results in one or more of the lower packing sets, particularly the primary packing set, receiving insufficient sealing compression force from the outset.

Accordingly, it is desirable that there be available a packing system that employs a packing stack of two or more packing sets that at all times from the outset provides adequate sealing compression force to all packing sets in the stack, particularly the primary packing set.

SUMMARY OF THE INVENTION

Pursuant to this invention, there is provided a stem valve system that carries multiple packing assemblies around the valve stem, an upper packing assembly compressed by a packing follower at the top of the upper most packing set in the assembly, and at least one of the lower packing sets in the assembly being compressed independently of the packing follower by way of at least one internal compression member.

By this invention at least the primary packing assembly can be loaded to a desired compressive load independently of the compressive load imparted by the movable packing follower that acts on a separate packing assembly that is disposed above the primary packing assembly.

DETAILED DESCRIPTION OF THE INVENTION

Figure 1:
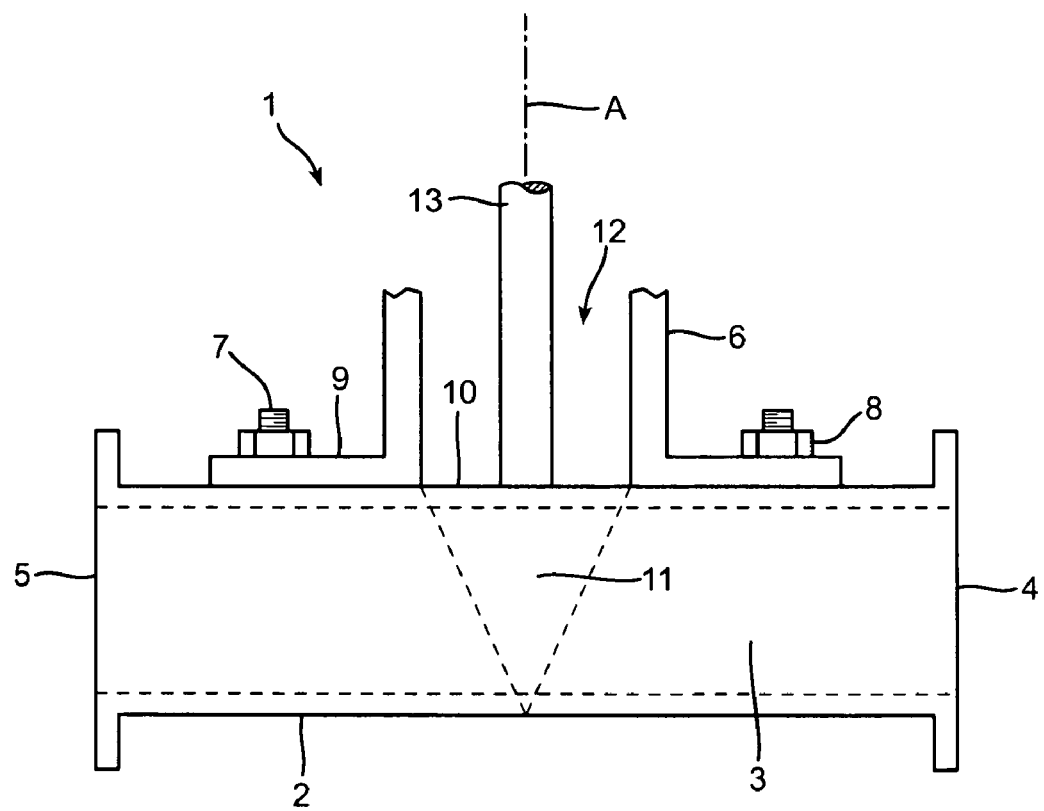
FIG. 1 shows a typical valve assembly that employs a stem that carries a control member for regulating the flow of process fluid through the body of the valve.

FIG. 1 shows valve assembly 1 comprising a flanged valve body 2 having a fluid flow passage 3 there through from its inlet end 4 to its outlet end 5. A valve mounting housing 6 is fixed to body 2 in a fluid sealed manner. Body 2 carries a plurality of bolts 7 that are adapted to pass through mating apertures in flange 9 of housing 6. Housing 6 is fixed to body 2 by way of nuts 8 engaging bolts 7 in conventional fashion. Body 2 has an aperture 10 through which moves process fluid control member 11.

Member 11 controls the flow of process fluid through passage 3 from fully closed as shown in FIG. 1 to fully open (not shown) when member 11 is fully retracted into recess 12 of housing 6. Movement of member 11 is caused by raising or lowering of elongate valve stem 13 up or down. Stem 13 has opposing ends, one of which carries control member 11, and is surrounded for most of its length by housing 6. Stem 13 has a longitudinal axis "A." Apparatus (not shown) is fixed to stem 13 to move it upwardly and/or downwardly. Such apparatus is well known in the art and further description is not necessary to inform the art.

Figure 2:
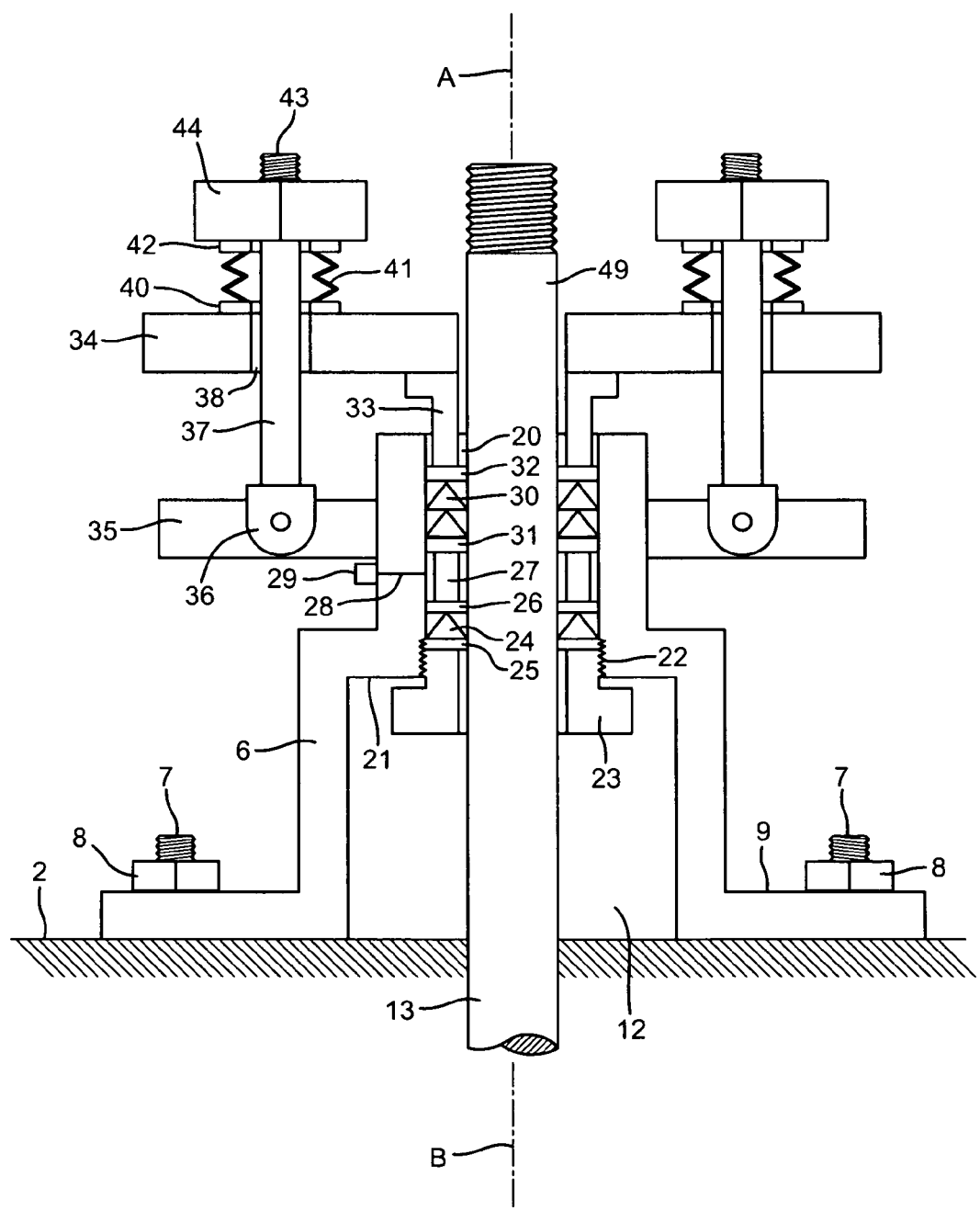
FIG. 2 shows in more detail a prior art valve system useful with the valve assembly of FIG. 1, and that employs multiple packing sets with live compressive loading of the upper most packing set using an externally spring biased packing follower.

FIG. 2 shows that body 2 is counter bored to provide lower bore 12 that is sized to receive the entirety of member 11 of FIG. 1, and an upper, narrower bore 20 sized to receive and hold the entirety of a packing assembly described hereinafter. Bore 20 has a single, constant transverse cross-sectional width. The lower end (shoulder) 21 of the portion of body 6 that contains bore 20 has internal threads 22 that threadably receive and engage an annular, externally threaded packing nut 23 that surrounds stem 13. Nut 23 supports the packing assembly disposed there above inside recess 20.

Bores 12 and 20 have the same longitudinal axis "B," and they are aligned with stem axis A.

Above packing nut 23, and contiguous therewith, is a first (primary) packing set composed of one or more flexible (woven), annular packing members 24 well known in the art. Annular packing support rings 25 and 26 are disposed on and in contact with the lower and upper ends, respectively, of packing set 24.

Above ring 26, and contiguous there with, is an annular spacer 27 that faces, but is spaced from, a bleed-off orifice 28 which passes through the wall of housing 6. Spacer 27 allows for the collection outside of housing 6 of process fluid that may by-pass packing set 24. A bleed-off connector 29 is provided so that conventional fluid collection equipment can be attached to orifice 28 in a fluid communication manner to remove fluid from inside housing 6 if and when needed.

Above spacer 27, and contiguous therewith, is an upper packing set 30 composed of one or more conventional annular packing members and having on the lower and upper ends thereof, respectively, annular packing support rings 31 and 32.

Ring 32 is in physical contact with a vertically movable annular packing follower 33 which in turn is in physical contact with movable, externally spring biased, annular flange member 34, all of which surrounds stem 13.

Body 6 carries a pair of support extensions 35 that extend laterally from that body beneath member 34. Extensions 35 carry, by way of pinned clevis 36, upright shafts 37. Shafts 37 extend through apertures 38 in member 34 and a substantial distance above member 34.

The portion of shaft 37 above the top of member 34 carries a spring support ring 40. Contiguous with ring 40 is a spring member 41. Spring 41 can be any conventional spring type, e.g., a coil spring. Contiguous with the top of spring 41 is another annular spring support ring 42. The upper end 43 of shaft 37 is threaded to receive adjusting nut 44. It can be seen that springs 41 are carried externally of housing 6.

Housing 6 encloses part, e.g., most, of the elongate length of stem 13 along its axis A, such enclosed length being intermediate the opposing ends of stem 13 and being spaced (extended) from the end of stem 13 that carries control member 11. Thus, distal (upper) end 49 of stem 13 extends externally of housing 6 for coupling to conventional stem moving (reciprocating) apparatus (not shown) well known in the art.

In operation, after packing nut 23 is in place and the packing assembly between nut 23 and follower 33 is in place inside bore 20, follower 34 is placed in contact with ring 32 and flange member 34, while shafts 37 are positioned as shown in FIG. 2. With the valve system thus assembled, nuts 44 are rotated about the long axes of shafts 37 to cause nuts 44 to move downwardly to compress springs 41. The compression of springs 41 causes downward movement of follower 33 which in turn applies a compressive load to the packing system in general, and the upper packing set 30 in particular. The single compressive load thus applied at the top of packing set 30 is relied upon to load both of packing sets 24 and 30 and them against stem 13 in a sealing manner.

The type of packing loading shown in FIG. 2 with its external springs that can be adjusted at will while the valve system is in operation is termed "live loading" in the art.

It has been found that because of the friction in packing sets 24 and 30 the compression loading going down this packing assembly is not uniformly transmitted to primary packing set 30 thereby, at the outset, preventing packing set 30 from receiving the total of the compressive loading needed for good sealing between packing set 30 and stem 13. This is not desirable, particularly if the valve system is employed in hazardous waste disposal service.

Figure 3:
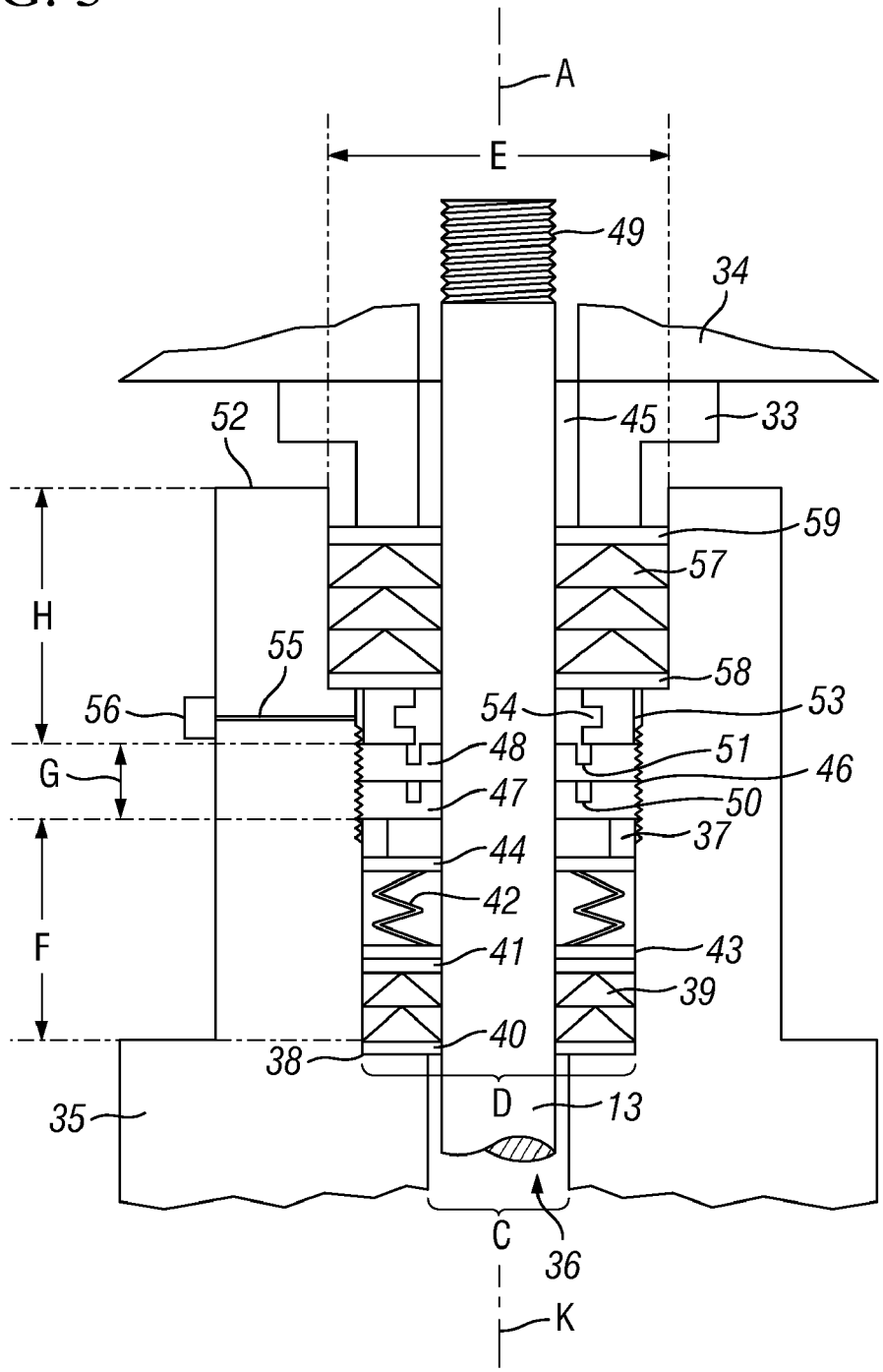
FIG. 3 shows one embodiment of a valve system within this invention.

FIG. 3 shows one embodiment within this invention which employs a valve mounting housing 35 that can be affixed to a valve body (not shown) in the manner of flange 9, bolts 7, and nuts 8 of FIG. 2.

Housing 35 is also counter-bored, but in a manner reverse from that of housing 6 in FIG. 2, in that first (lowest) bore 36 which is adjacent the valve body (not shown) has a smaller transverse cross-sectional width C than the transverse (lateral) cross-sectional width D of medial counter-bore 37 of housing 35. Distal (upper) counter-bore 45 in turn has a larger transverse cross-sectional width E than the transverse cross-sectional width D of medial bore 37. This is better shown by reference to FIG. 4.

When bores C, D, and E are essentially round in their transverse cross-section, which is preferred but not required, widths C, D, and E will be the diameter of each of those bores. The term "diameter" will be used hereinafter for sake of clarity and not in way of restriction as to the scope of the transverse cross-sections useful in this invention.

As with FIG. 2, lower bore 37 is sized in internal dimensions to receive in its entirety a movable, fluid passage control member such as member 11 of FIG. 1.

Similarly, housing 35 encloses part, e.g., most, of the elongate length of stem 13 along its axis A, such enclosed length being intermediate the opposing ends of stem 13 and being spaced (extended) from the end of stem 13 that carries control member 11. Thus, distal (upper) end 49 of stem 13 extends externally of housing 6 for coupling to conventional stem moving (reciprocating) apparatus (not shown) well known in the art.

The longitudinal axis A of stem 13 in FIG. 3 is aligned with the longitudinal axis K of bores 36, 37, and 45 in the same manner as axes A and B of FIG. 2 are aligned.

Bore 37 carries above shoulder 38 a first packing assembly. The exemplary assembly shown is the lower, primary packing assembly. This packing assembly contains an annular packing set 39 having annular packing rings 40 and 41 contiguous with its lower and upper ends, respectively, all surrounding stem 13. Above packing set 39 in this assembly is a spring pack 42 having annular spring support rings 43 and 44 contiguous with its lower and upper ends, respectively. Spring pack 42 can contain one or more springs commonly employed in the art, e.g., coil, wave, belleville, and the like.

The upper, interior end of bore 37 carries engagement means for applying sealing compression to the packing assembly in bore 37, and locking in that compression loading. In the example of FIG. 3 the engagement means is internal threads 46 in threaded portion G. Engaged with threads 46 is an annular compression nut 47 that is carried internally of housing 35 and in physical contact with ring 44 of the primary packing assembly. Contiguous with nut 47 is annular locking nut 48. Each of nuts 47 and 48 have recesses 50 and 51 spaced apart around the upper periphery thereof which recesses are adapted to receive prongs from a rotational installation tool (not shown).

Rotation of nut 47 about and along axes A and K moves that member in a direction parallel to the longitudinal axes of stem 13 and bores 36, 37, and 45, thereby enabling a user of a rotational tool to apply, by way of nut 47, the desired sealing compressive force directly to the primary packing assembly, i.e., to packing set 39 by way of spring pack 42. This is in clear distinction to the apparatus of FIG. 2 wherein the compressive force was applied to lowest packing set 24 only through upper packing set 30 that is intermediate of the packing follower 33 and packing set 24. Thus, in the inventive arrangement of FIG. 3, all of the compressive force needed for good sealing between packing set 39 and stem 13 is reliably applied to that packing set at the outset.

Rotation of nut 48 about and along axes A and K moves that member in a direction parallel to the longitudinal axes of stem 13 and bores 36, 37, and 45, thereby enabling a user of a rotational tool to lock nut 47 in place once the desired compressive force has been applied by way of nut 47 and spring(s) 42 to packing set 39.

Figure 4:
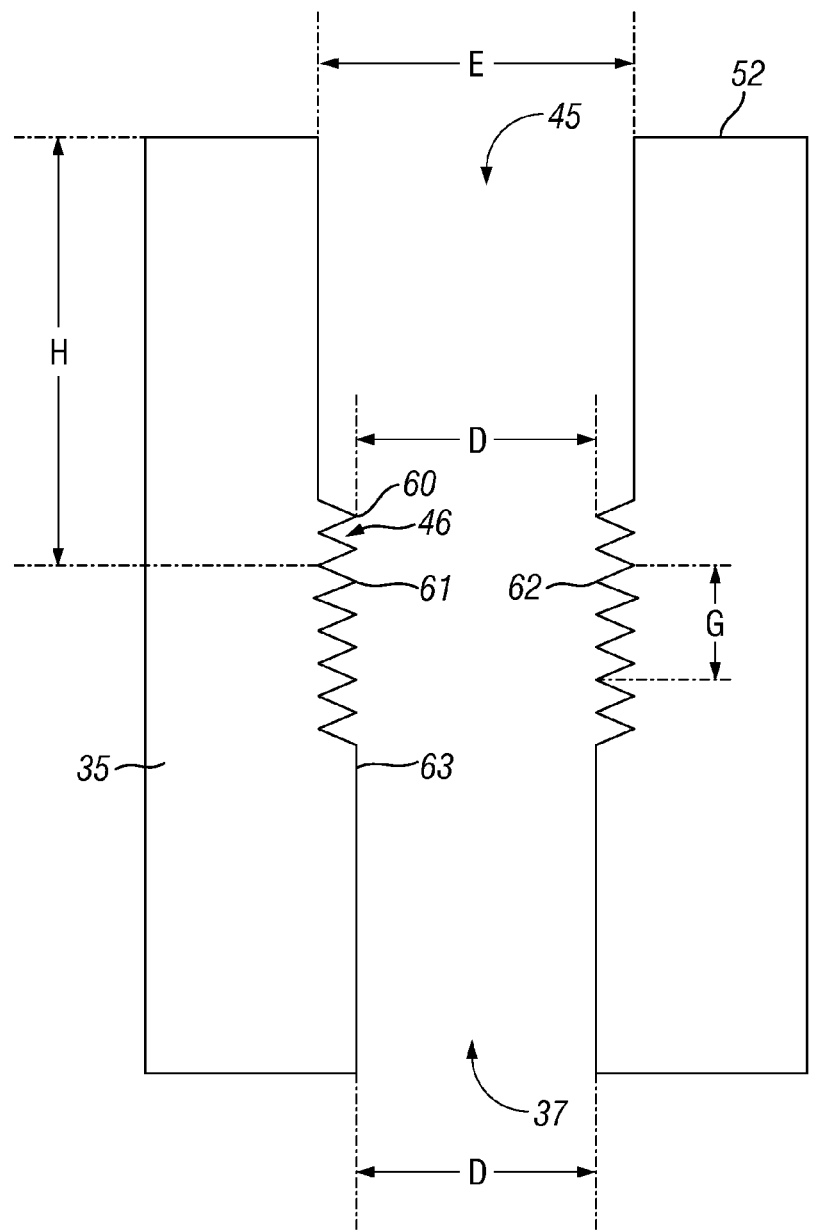
FIG. 4 shows an enlargement of the medial and distal sections of the packing containment section of the valve system of FIG. 3.

The top end of threads 46 defines the top end of bore 37, see FIG. 4. Above the uppermost thread of threads 46, counter-bore 45 begins and continues to the top end 52 of housing 35.

The packing stack of FIG. 3 also includes an upper packing assembly that is contiguous with the upper end of the lower packing assembly. In the exemplary packing assembly of this Figure, the lowest portion of the upper packing assembly includes, contiguous with the top of locking nut 48, a rigid, annular spacer 53 having a circumferential groove 54. Grooved spacer 53 can be any commonly used member such as a lantern ring. Groove 54, in the example of FIG. 3, faces a fluid conductive orifice 55 that extends fully through the wall of housing 35 to the exterior of that housing. Orifice 55 is capped on the exterior of housing 35 by a connector 56 to which drainage (bleed) equipment (not shown) can be attached. The upper packing assembly also includes a packing set 57 having annular packing rings 58 and 59 contiguous with its lower and upper ends, respectively. Packing set 57 is disposed above and in contact with spacer 53. In this manner, any process fluid that may escape the flow passage of the valve body into first bore 36 and by-pass packing set 39 can be collected in groove 54 in a sealing manner below packing set 57 and removed in a controlled manner through orifice 55 and connector 56.

Contiguous with ring 59 is packing follower 33 of FIG. 2. Packing set 57 is live loaded in the manner shown and described in FIG. 2 using elements 34-38 and 40-44 of that Figure.

Thus, it can be seen from FIG. 3 that the upper (packing gland) portion of housing 35 is composed of an upstanding length F plus threaded portion G that together define medial bore 37 having a diameter D. Medial bore 37 is surmounted by an upstanding length H that defines distal bore 45 that has a diameter E, which is greater than diameter D.

In operation, packing set 39 and spring 42, with their associated rings, are placed in medial bore 37 and compression nut 47 rotated on threads 46 to move same downwardly along axes A and K thus compressing spring 42 until packing set 39 is compressed to the desired load thereby sealing packing set 39 in a fluid tight manner to stem 13. Thereafter, nut 48 is rotated on threads 46 in like manner until its lower surface tightly abuts the upper surface of nut 47 and fully locks nut 47, spring 42, and packing set 39 into their desired fixed sealing loading. In this manner the required sealing loading on packing set 39 is assured at the outset by way of members 42 and 47 that are carried internally of valve housing 35. Thereafter, spacer 53 and packing set 57, with their associated supporting rings, are installed in bore 45 and live loaded by way of follower 33 and separate, independent, external spring pressure (spring 41 compressed between flange 34 and nut 44, FIG. 2) so that the proper sealing loading on packing set 57 is also assured.

This combination of live loading at least one upper packing set, and independently, internally fixed loading of at least one primary packing set produces uniform sealing loading along the full sealing length of stem 33. This arrangement produces a sealing result that is far more reliable in its sealing effect and duration than that achieved by transmitting the entire sealing loading from a single, upper follower 33 through a plurality of stacked packing sets 24 and 30, as shown in FIG. 2.

FIG. 4 shows an enlarged portion of housing 35 of FIG. 3 to better show the relative relationship and transition between medial bore 37 and distal bore 45, particularly threaded portion G of the upper end of medial bore 37. In the example of FIG. 3, at the top end 60 of medial bore 37 threads 46 start and continue downwardly along the interior surface of medial bore 37 until sufficient threads 46 have been provided at least to receive the length of both of externally threaded nuts 47 and 48 (FIG. 3), i.e. length G. The inwardly extending, opposing tips 61 and 62 of threads 46 are spaced apart for the same diameter D as the rest of non-threaded medial bore 37 63. Immediately above medial bore end 60, distal bore 45 begins and continues to the top end 52 of housing 35.

I claim:

1. A control valve having a valve body with a fluid flow passage there through; a valve stem having a longitudinal axis, opposing ends, and finite length; said stem carrying a control member at one end; said stem and control member being moveably carried in said valve body, a valve mounting housing carried by said valve body and enclosing part of the length of said valve stem that is intermediate said opposing ends and spaced from said control member; said mounting housing having 1) a first bore adjacent said valve body, said first bore having a first cross-sectional width, 2) a medial bore having a second cross-sectional width that is larger than said first cross-sectional width, said medial bore having an end adjacent said first bore, and 3) a distal bore having a third cross-sectional width that is larger than said medial cross-sectional width, said distal bore having an end adjacent said medial bore; said medial bore carrying engagement means adjacent said distal bore; a first packing assembly in said medial bore and extending to said engagement means; a compression member engaging said engagement means and said first packing assembly; a locking member engaging said engagement means and said compression member; and a second packing assembly carried in said distal bore; said second packing assembly having a packing follower, said packing follower being live loaded by springs external to said housing.

2. The apparatus of claim 1 wherein said first bore and medial bore are contiguous at their adjacent ends, and said medial bore and distal bore are contiguous at their adjacent ends.

3. The apparatus of claim 1 wherein said engagement means is a threaded portion of said medial bore which has inwardly directed opposing thread tips, the cross-sectional width between said thread tips being no smaller than said medial bore cross-sectional width, and said distal bore cross-sectional width being greater than said cross-sectional width between said thread tips.

4. The apparatus of claim 1 wherein said first, medial, and distal bores are each essentially round, and said cross-sectional widths of said bores are their diameters.

5. The apparatus of claim 1 wherein said second packing assembly includes a grooved spacer, and said mounting housing carries a bleed orifice adjacent said grooved spacer.

6. The apparatus of claim 1 wherein said live loading of said packing follower includes an abutting movable flange member that encompasses said stem, said flange member being spring biased against said packing follower, said spring bias being adjustable so that the compression force applied to said packing follower can be varied at will externally of said housing.

7. The apparatus of claim 1 wherein said stem is at least one of 1) moveable directly along said longitudinal axis of said stem to open and close said fluid flow passage, 2) rotatable about said longitudinal axis of said stem to effect movement of said stem along said longitudinal axis of said stem to open and close said fluid flow passage, and 3) rotatable about said longitudinal axis of said stem to open and close said fluid flow passage without movement of said stem along said longitudinal axis of said stem.

* * * * *